Sept. 15, 1959

J. C. McMILLAN 2,904,766

LINEAR MOTION POTENTIOMETER

Filed March 20, 1957

INVENTOR.
JOHN C. MCMILLAN

BY

ATTORNEY

United States Patent Office 2,904,766
Patented Sept. 15, 1959

2,904,766

LINEAR MOTION POTENTIOMETER

John C. McMillan, Pomona, Calif., assignor to General Dynamics Corporation, San Diego, Calif., a corporation of Delaware Application March 20, 1957, Serial No. 647,391

7 Claims. (Cl. 338—176)

This invention relates to variable resistors and more particularly to linear motion potentiometers wherein mating contacts are unaffected by adverse environmental conditions, the elements are interchangeable and adjustable to conform to desired tolerances and in which the housing may be removed without disturbing the components therein to permit viewing during operation.

The potentiometer art is well-developed and there are many types of potentiometers for performing general and special functions. They generally consist of a housing with input and output terminals, a resistive element each end of which is connected to a separate terminal, and a slider element for making contact between the resistive element and the other terminal. The resistive element may vary in resistance along its length in a linear or non-linear manner as desired. An external force positions the slider element along the resistive element to indicate the magnitude and direction of the force applied. External circuitry connected to the terminals converts the slider position on the resistive element into useful information concerning the position of the slider with respect to total movable distance. The use of potentiometers is almost unlimited, it being necessary only to fabricate one of the size, sensitivity and dependability to meet the requirements of its intended use. Invention in potentiometers usually resides in improvements wherein potentiometer structure has been adapted in a novel manner to meet special requirements.

The potentiometer structure illustrating the principles of the present invention solves a three-fold problem, that of providing a potentiometer that retains its sensitivity and dependability in adverse condition of severe vibration, shock and sustained accelerations, a potentiometer capable of precise adjustment of interchangeable elements and whose precision within pre-set tolerances is maintained, and finally a potentiometer whose cover may be removed without disturbing the calibration or the mating contacts to facilitate fabrication, adjustment and repair.

It is therefore an object of this invention to provide for a potentiometer which is unaffected by conditions of severe vibration, shock and sustained high accelerations.

Another object is the provision of a potentiometer wherein the wipers are not subjected to extraneous trolley block movement.

Another object is the provision of a potentiometer wherein extraneous trolley block movement is eliminated through the use of trolley guides and novel connection of the block with its actuating shaft.

Another object is the provision of a potentiometer wherein the wipers are not subjected to extraneous movements of the resistive elements and pick-off strips associated therewith.

Another object is the provision of a potentiometer wherein undesired vibration of the wipers is eliminated by using wipers having a resonant frequency much above the anticipated vibration frequencies to which the potentiometer may be subjected.

Another object is the provision of a potentiometer wherein a higher natural frequency of the wipers is achieved through the use of a cantilever beam type leaf spring wiper.

Another object is the provision of a potentiometer capable of precise adjustment of contact elements for maximum sensitivity yet which are interchangeable to perform other functions.

Another object is the provision of a potentiometer wherein the resistive elements are capable of longitudinal adjustment and are removably secured against movement.

Still another object is the provision of a potentiometer wherein the internal moving parts may be observed without interference therewith.

Another object is the provision of a potentiometer having a removable cover to permit viewing of moving parts to facilitate assembly, adjustment and maintenance.

Another object is the provision of a potentiometer having a removable cover for protecting the inner parts from exposure only and does not support or carry any internal parts.

Other objects and features of the present invention will be readily apparent to those skilled in the art from the following specification and appended drawings wherein is illustrated a preferred form of the invention, and in which.

Figure 1:
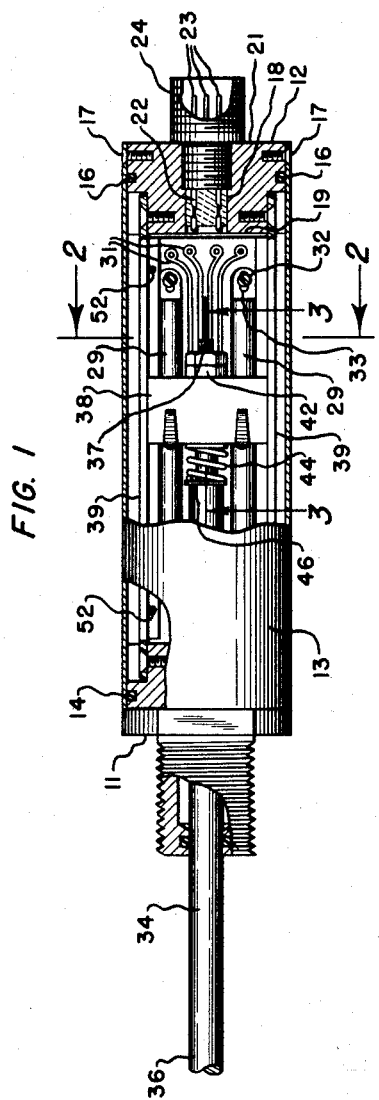
Figure 1 is a plan view with parts broken away to facilitate its illustration.

Reference is now made to the drawings wherein like numerals refer to like parts throughout each of the several views. The potentiometer housing consists of a base 10 and end portions 11 and 12, integrally formed with the base and a removable cover 13. In this configuration the end portions are circular in cross-section and cover 13 is a cylindrical member fitted thereover and removably sealed with O-rings 14 and 16 in dust-free relationship. A set screw 17 locks the cover to end portion 12 to secure the cover from accidental removal. End portion 12 has a central aperture 18 communicating between its interior 19 and exterior surfaces 21 through which electrical connectors 22 are inserted. These connectors terminate at their outer ends in male plug members 23 for convenience in connecting to external circuitry. An externally threaded sleeve 24 fits over the male plug members to protect them from damage and to prevent their accidental disengagement in use. The base 10 has a flat top surface 26, shown in Figure 2 and Figure 3, to permit resistance boards 27 to be mounted thereon. These boards have grooves 28 extending longitudinally thereon to receive variable resistive elements 29 such as micro-wire wound over an insulated core such as glass or plastic for example. These elements fit snugly into the grooves 28 and are bonded thereto to prevent their movement relative to the boards during vibration. The resistance boards also have printed circuits 31 thereon for connecting various lengths of the winding to various ones of the electrical connectors 22, as desired. The connectors may be soldered to terminals of the printed circuits in a conventional manner. The resistance boards 27 are mounted to the top surface 26 of base 10 by means of set screws 32 extending therein through elongated slots 33 in the boards. In this manner the boards may be interchanged as desired and also may be adjusted in a longitudinal direction for accuracy and precision.

The other end portion 11 has a center aperture therein between its inner and outer surfaces to receive an actuating shaft 34. The outer end 36 of shaft 34 is adapted to receive an external force which determines the positioning of the wiper.

Attached to the inner end 37 of shaft 34 is a trolley block 38. Suitable rails 39 extend between the end portions 11 and 12 upon which the block 38 is carried. Recesses 41 in the block engage the upper and lower surfaces of the rails and prevent rotation of the block. This trolley block is of non-conductive material having a low coefficient of friction. This material is preferably of material softer than the rails so that it will not score or gall the rails. Furthermore, any particles or dust caused by friction between the rails and the block will then be from the non-conducting block and thus will not accidentally cause a shorting of any circuits. A stable synthetic plastic material such as nylon (synthetic linear polyamide) or a polymerized tetrafluoroethylene resin, commonly called Teflon, has been found to be a suitable material although other materials having these characteristics are also satisfactory.

The trolley block 38 is secured to the inner end 37 of shaft 34 in a manner such that rotation of the shaft or its longitudinal misalignment will not effect the block. This is best shown with reference to Figure 3 where inner end 37 of shaft 34 extends through an opening in the block. The block is secured to the shaft by locknuts 42 which permits longiutdinal adjustment of the block along the axis of the shaft. The opening in the block is somewhat larger than the shaft so that provision may be made for a minimum of contact points therewith and to prevent lateral binding of the block due to misalignment of the shaft by application of the external force. As shown the shaft has been recessed and shouldered at 43 to accommodate a spring 44 faced with washers 46 and 47 at each end. One washer 46 abuts the shoulder 43 of the shaft 34 and the other washer 47 abuts the surface 48 of the block about the opening. The opposite end of the opening has been enlarged at 49 to receive a bearing 51 positioned inwardly of the locknuts 42. This bearing is of hemispherical configuration with the rounded surface contacting the enlarged end 49 of the opening in a ball and socket type of engagement. The spring 44 urges the block 38 into contact with the bearing 51 and also supports that end 48 of the block in spaced relation about the shaft. This permits enough lateral block movement by pivotal movement around the bearing 51 as a fulcrum, to prevent any lateral bind of the block on the rails. Stop pins 52, shown in Figure 1, extend through the rails 39 to limit the longitudinal movement of the trolley block 38. The spring 44 also serves to absorb the extreme inward movement of the shaft when further movement of the block has been stopped by engagement with inner stop pin 52.

Figure 2:
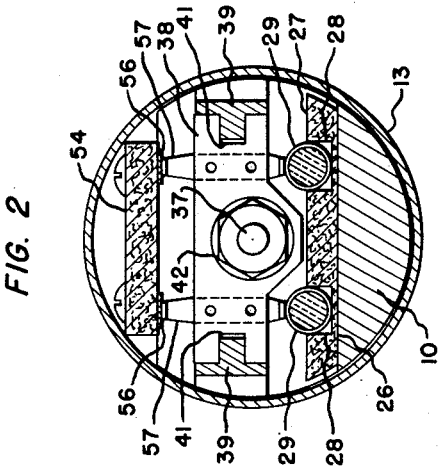
Figure 2 is a cross-sectional view taken along lines 2—2 of Figure 1.
Figure 3:
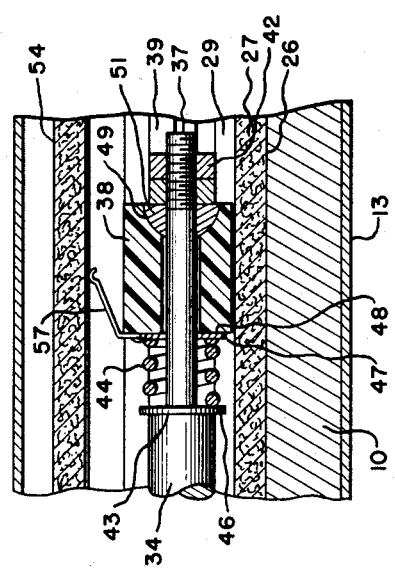
Figure 3 is an enlarged sectional view taken along lines 3—3 of Figure 1.

Ends 11 and 12 have recesses therein above the plane of shaft and trolley block movement whereby wiper pick-off boards 54 may be mounted in parallel arrangement with the resistance boards 27. As shown in Figure 2, conducting wiper pick-off strips 56 are positioned in vertical alignment with the resistive elements 29 on the resistance boards 27. These strips are preferably formed as in printed circuits by etching and plating with nickel or silver and finally plated with rhodium for a hard excellent wearing surface. The strips are connected to certain of the electrical connectors 22 and hence to the male plug members 23 for connection to external circuitry. Contact between the wiper pick-off strip 56 and its associated resistance element 29 is through a leaf spring wiper 57 mounted on the block 38 as a cantilever beam. One end engages the pick-off strip 56 and the other end engages the resistive element 29. The center portion of the spring is mounted on the block as by rivets, screws or other securing means. In this manner a resonant frequency of the wiper is achieved which is higher than any anticipated frequency of vibration to which the instrument may be subjected. It should be noted that the ends of the wiper are pointed toward the pivotal end of the block, i.e., toward the end contacting the bearing 51. In this manner the contact points of the wiper do not have the lateral play possible at the end of the block opposite the bearing and thus will not become disengaged from their associated contacts.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. In a potentiometer, a trolley block having longitudinally extending recesses along the side walls thereof, guide rails in said potentiometer cooperatively engaging said recesses to confine trolley movement therealong, said block being of a non-conductive material having a low coefficient of friction and of a softer material than said guide rails, a shaft having one end thereof pivotally connected to one end of said block, a wiper of conductive resilient material connected at its mid-portion to the other end of said block and having end portions extending over and under the top and bottom surfaces respectively of said block.

2. A potentiometer comprising a body portion having resistive elements and return pick-off strips mounted thereon, a trolley block having wipers thereon mounted for longitudinal movement along said resistive elements and pick-off strips, mechanical means connected to said block for movement thereof, guide rails mounted on said body portion and engageable with said block, said mechanical means comprising a shaft recessed and threaded at its inner end, an aperture in said block for receiving said inner end, a resilient member over said inner recessed end and engageable with said block, said block having an enlarged opening in one end, a hemispherical bearing insertable over said threaded shaft end and engageable with said enlarged block opening, and lock nuts threadedly engageable with said inner end for adjustably positioning said block along said recessed shaft end.

3. A potentiometer as in claim 2 wherein said block is held in spaced relation from said recessed end by said resilient member and said bearing.

4. A potentiometer as in claim 2, stop means on said rails for limiting inner movement of said block, said resilient means permitting additional inner movement of said shaft when said block is stopped by said stop means.

5. In a potentiometer, a trolley block adapted for movement between resistive elements and conductive pick-off strips mounted in parallel spaced relation therefrom, a shaft having one end thereof pivotally connected to one end of said block, a wiper of resilient and conductive material connected at its mid-portion to the other end of said block and having end portions extending over and under the top and bottom surfaces respectively of said block, said end portions engaging said resistive elements and pick-off strips and maintaining the axial alignment of said block parallel thereto.

6. A potentiometer comprising a body portion having resistive elements and return pick-off strips mounted thereon, a trolley block having wipers thereon mounted for longitudinal movement along said resistive elements and pick-off strips, a shaft, an aperture in said block larger than said shaft to permit pivotal movement of said shaft relative to said block when said shaft is inserted through said aperture, abutment means on the end of said shaft for engaging said block to prevent its withdrawal from said shaft, and resilient means mounted on said shaft and urging said block against said abutment means to thereby urge alignment of the axis of said block parallel to said elements and strips.

7. A potentiometer comprising a body portion having resistive elements and return pick-off strips mounted thereon, a trolley block having wipers thereon mounted for longitudinal movement along said resistive elements and pick-off strips, mechanical means connected to said block for movement thereof, said mechanical means comprising a shaft recessed at its inner end, an aperture in said block for receiving said inner end, a resilient member over said inner recessed end and engageable with said block, said block having an enlarged opening in one end, a hemispherical bearing insertable over said shaft inner end and engageable with said enlarged block opening.

References Cited in the file of this patent

UNITED STATES PATENTS

| | | |
|---|---|---|
| 763,812 | Tracy | June 28, 1904 |
| 2,174,504 | Cole | Sept. 26, 1939 |
| 2,668,218 | Searle | Feb. 2, 1954 |
| 2,706,230 | Bourns et al. | Apr. 12, 1955 |
| 2,759,080 | Bourns | Aug. 14, 1956 |
| 2,777,925 | Stolz | Jan. 15, 1957 |
| 2,805,307 | Bourns et al. | Sept. 3, 1957 |